(12) United States Patent
Ayres et al.

(10) Patent No.: US 7,184,383 B2
(45) Date of Patent: Feb. 27, 2007

(54) MEDIUM POSITION SENSING

(75) Inventors: Mark R. Ayres, Boulder, CO (US); Michael J. Lipney, Boulder, CO (US); Keith W. Malang, Longmont, CO (US); Curt J. Goodknight, Boulder, CO (US)

(73) Assignee: Inphase Technologies, Inc., Longmont, CO (US)

( * ) Notice: Subject to any disclaimer, the term of this patent is extended or adjusted under 35 U.S.C. 154(b) by 911 days.

(21) Appl. No.: 10/351,464

(22) Filed: Jan. 24, 2003

(65) Prior Publication Data

US 2004/0027668 A1    Feb. 12, 2004

Related U.S. Application Data

(60) Provisional application No. 60/352,099, filed on Jan. 24, 2002.

(51) Int. Cl.
*G11B 7/00* (2006.01)
(52) U.S. Cl. ............. 369/109.01; 369/53.29; 369/103; 369/275.4
(58) Field of Classification Search ............. None
See application file for complete search history.

(56) References Cited

U.S. PATENT DOCUMENTS 4,420,829 A   12/1983   Carlson
5,602,820 A   2/1997    Wickramasinghe et al.

6,625,100 B2   9/2003   Edwards

OTHER PUBLICATIONS

International Search Report mailed on Apr. 14, 2004, for PCT patent application No. PCT/US03/34560 filed on Oct. 29, 2003, 4 pgs.
D. Abramovitch, "Magnetic and Optical Disk Control: Parallels and Contrasts", Agilent Technologies, Jun. 25, 2001, 17 pgs.
S. N. Bashkirov PhD, "DVD System Software Simulator", Samsung El., Joint International Symposium on Optical Memory and Optical Data Storage, 2002, 12 pgs.
G. Bouwhuis et al., "Principles of Optical Disc Systems", Publ. A. Hilger Ltd. Bristol and Boston, 1986, pp. 7-209.

(Continued)

*Primary Examiner*—Paul W. Huber
(74) *Attorney, Agent, or Firm*—Morrison & Foerster LLP

(57) ABSTRACT

A method of determining coordinates for a storage medium includes: determining diffraction data from a plurality of diffraction patterns corresponding to diffractive markers of the medium; and combining the diffraction data to determine composite coordinates for the medium. The composite coordinates may include three translational coordinates and three rotational coordinates. The act of determining diffraction data may include shining a plurality of beams on a selection of the diffractive markers, and measuring the corresponding diffraction patterns in one or more photodetectors to determine the diffraction data. In this latter case the photodetectors may be segmented. The act of combining the diffraction data to determine composite coordinates may include solving a matrix system that couples the diffraction data and the composite coordinates. Each diffractive marker may include a pit. The storage medium may include a holographic storage medium.

39 Claims, 16 Drawing Sheets

OTHER PUBLICATIONS

S. Gerger, "DVD Testing Principles & Practices", Optical disc systems, Jul.-Aug. 1998, 9 pgs.

A. B. Marchant, "Optical Recording", A Technical Overview, Addison-Wesley Publ. 1990, 10 pgs.

S. Stallinga, "Optical Aspects of Recording and Playback", ODS, Santa Fe, Apr. 21, 2001, 27 (double sided) pgs.

EDA tools Café, "Built-in Self-test", Addison Wesley Longman, Inc., 1997, 13 pgs.

ISOM/ODS 2002, Joint International Symposium on Optical Memory and Optical Data Storage, Jul. 2002, IEEE/LEOS, 2 pgs.

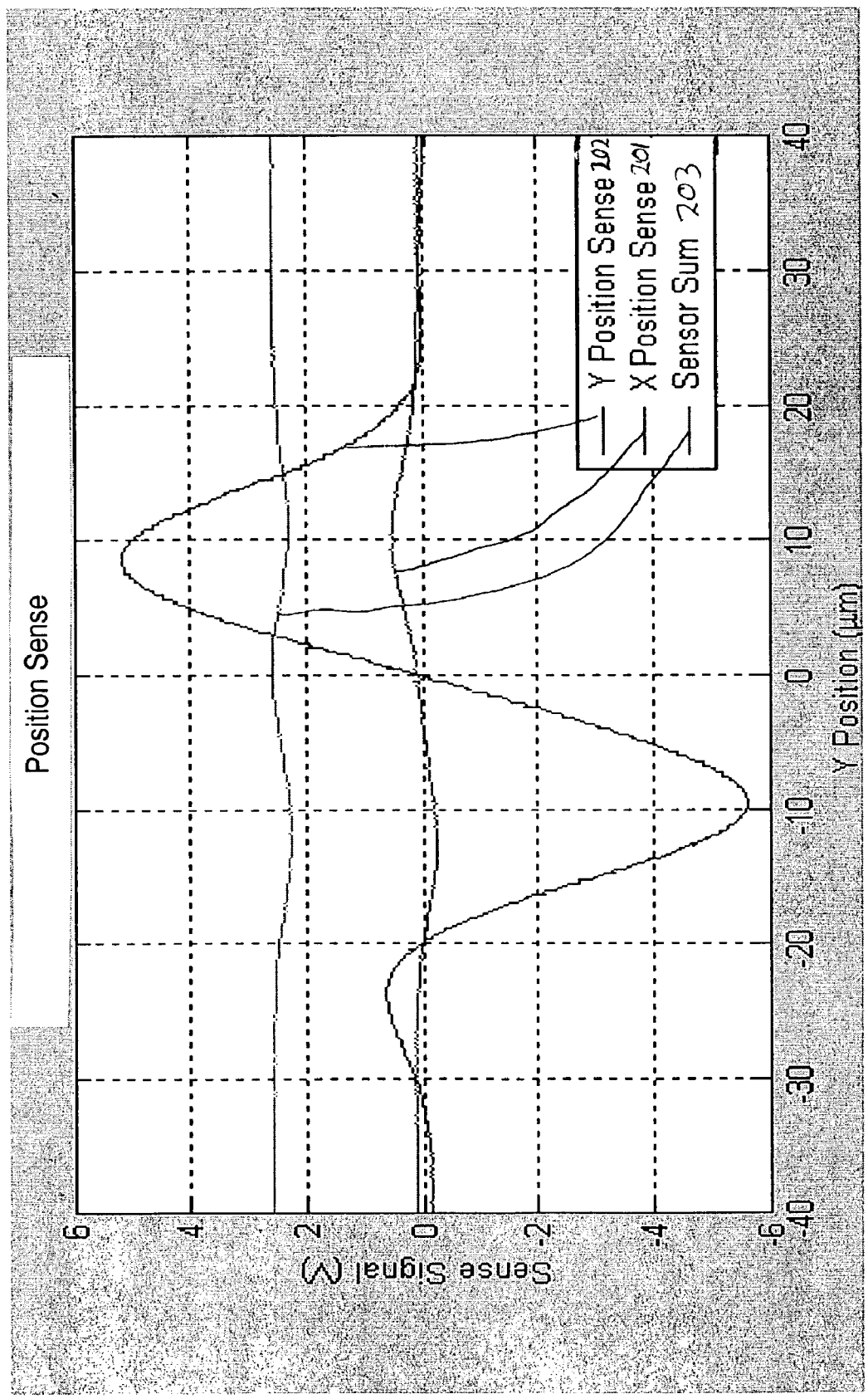

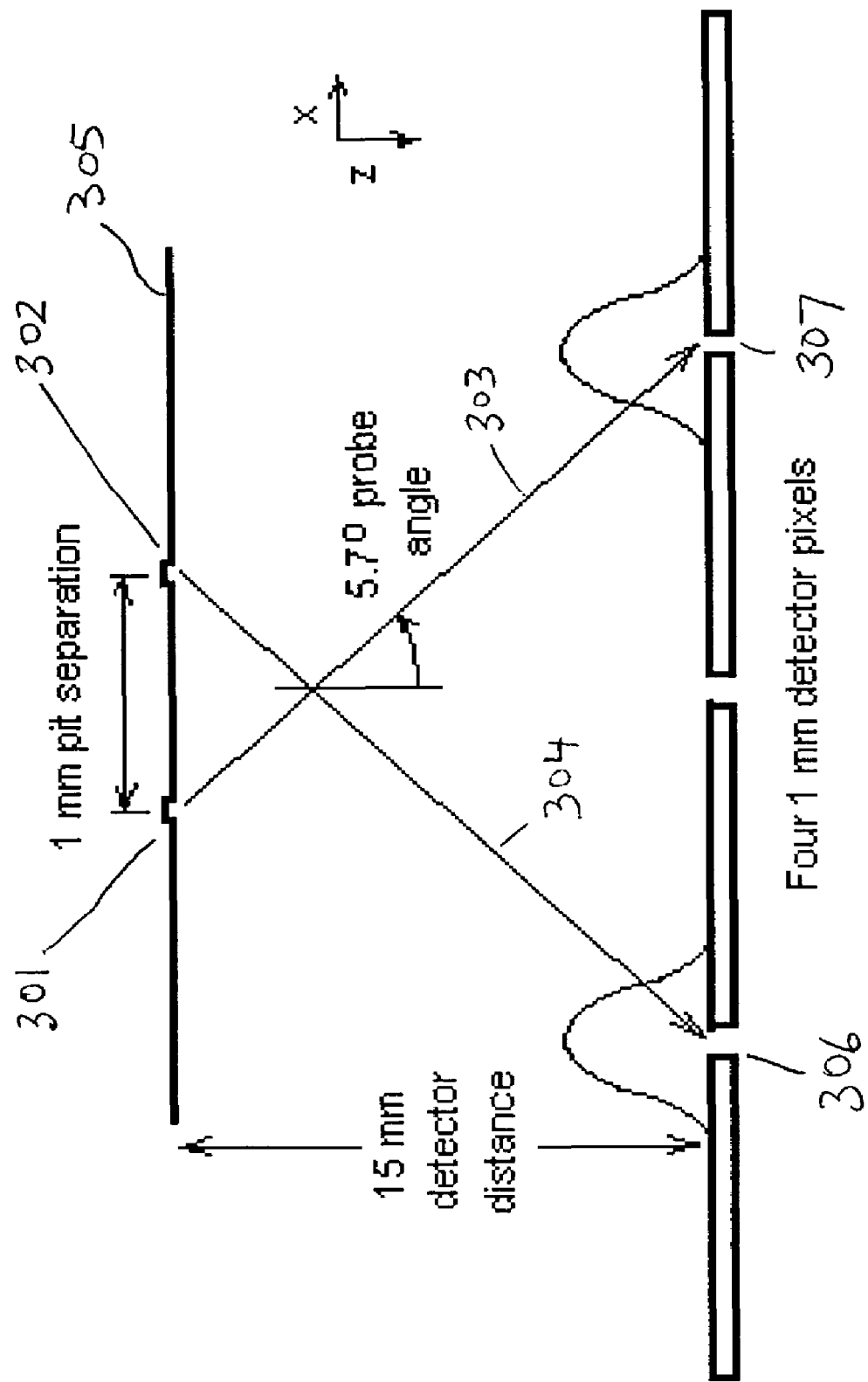

Detector intensity distribution at x = 0 μm

Detector intensity distribution at x = -10 μm

FIG 10 Embossed Stack Marker

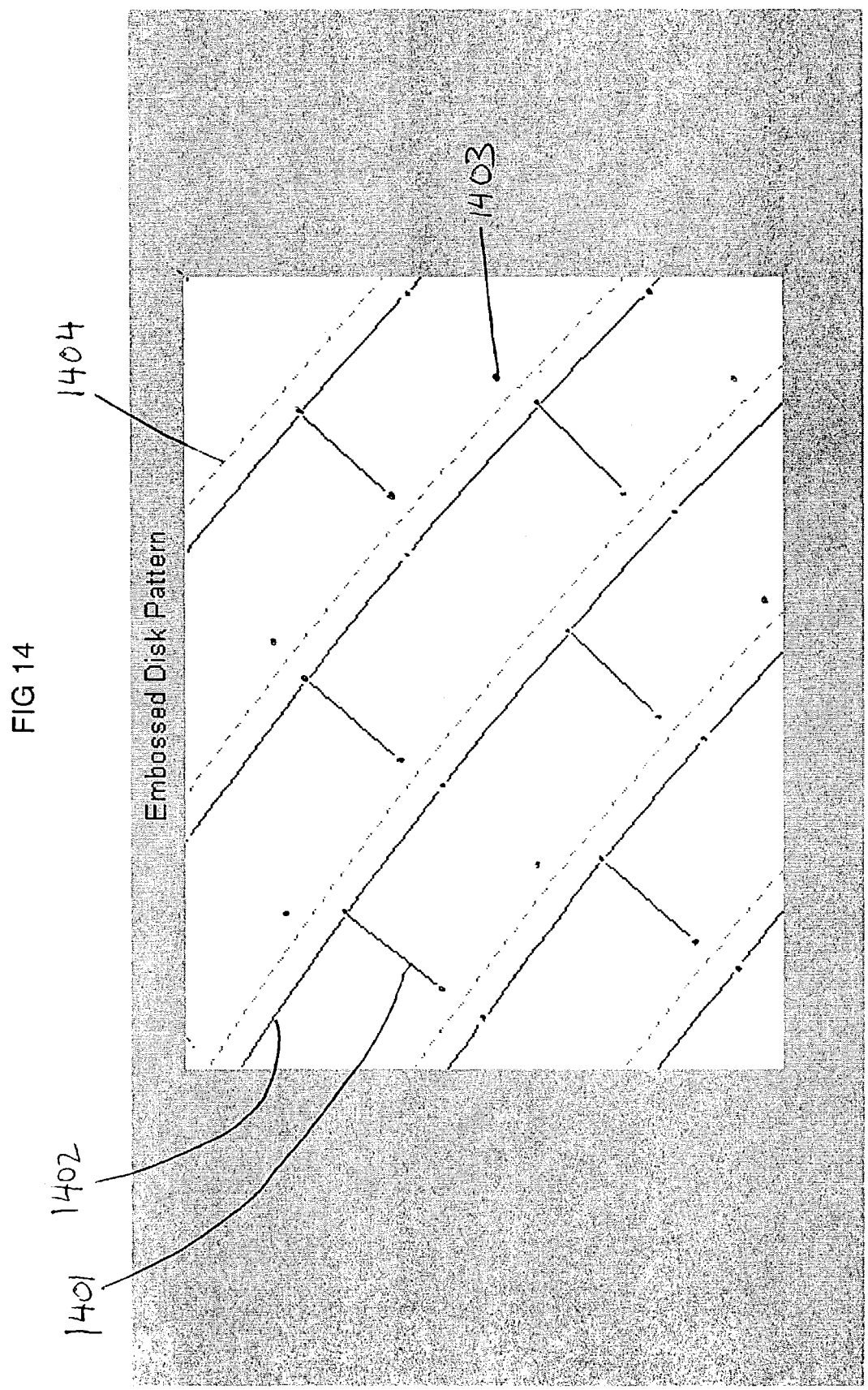

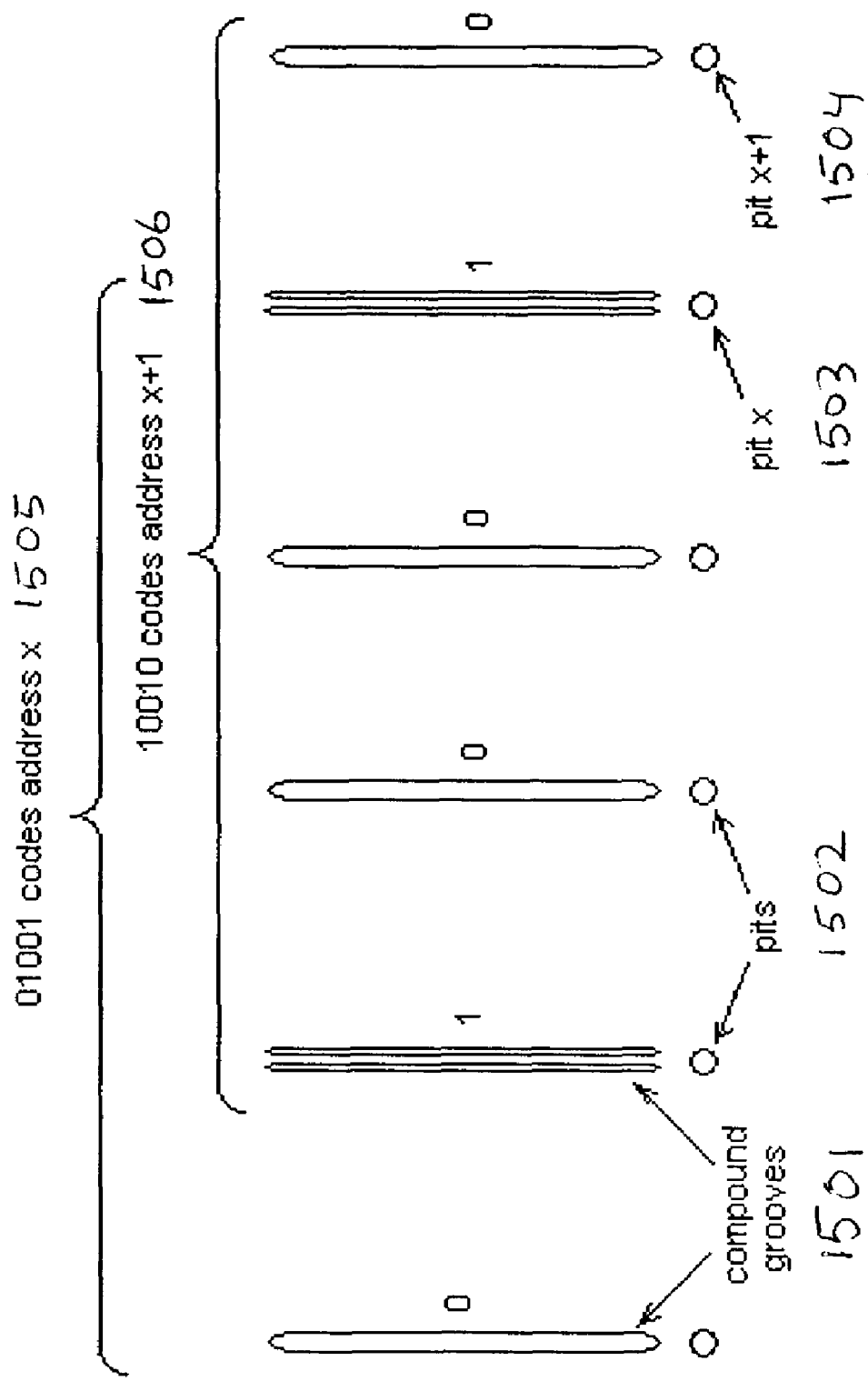

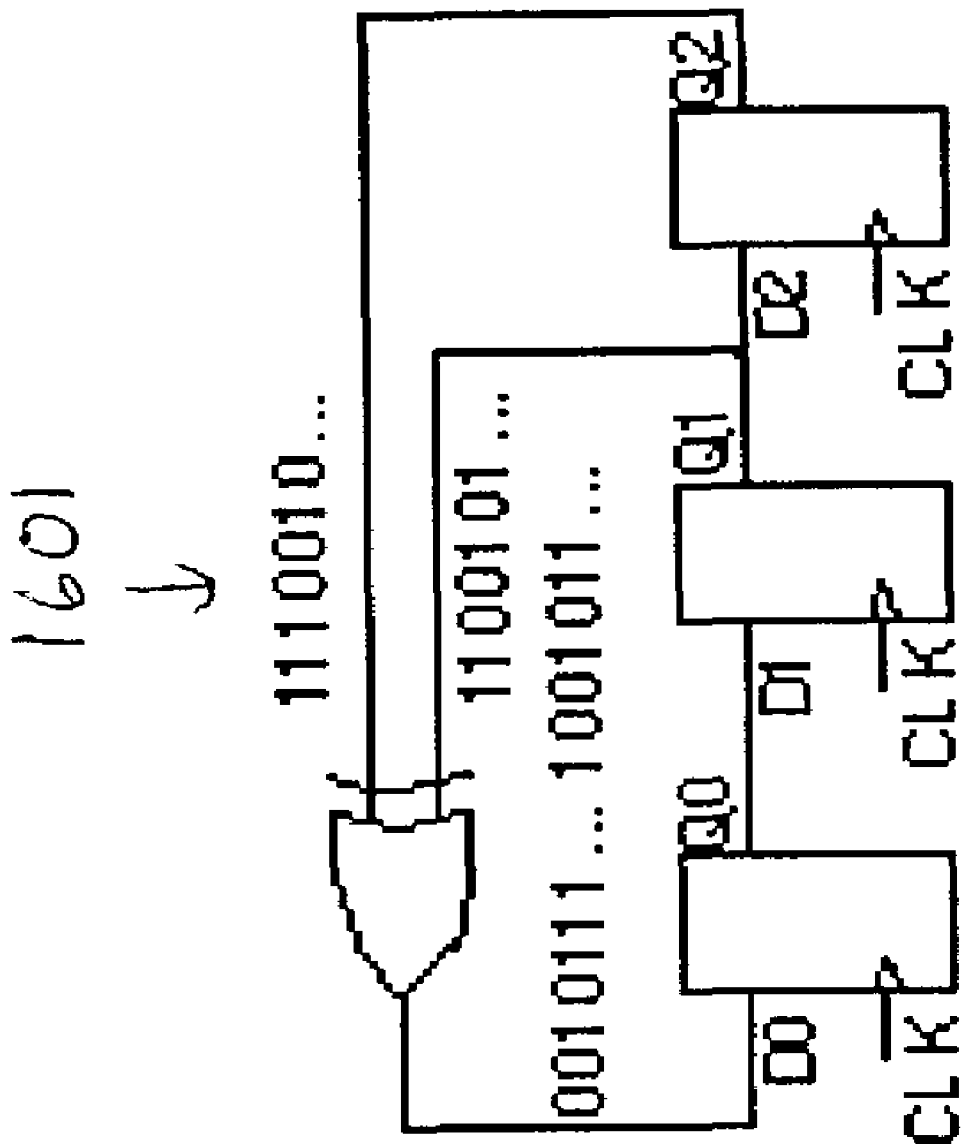

MEDIUM POSITION SENSING

CROSS-REFERENCE TO RELATED APPLICATIONS

This application claims the benefit of provisional application No. 60/352,099, filed Jan. 24, 2002, which is incorporated by reference in its entirety.

BACKGROUND OF THE INVENTION

1. Field of Invention

The present invention relates to data storage generally and more particularly to data storage in a holographic medium.

2. Description of Related Art

Push-pull tracking (or sometimes "differential push-pull") is long established in the art of optical recording. For example, this approach has been used as a tracking-error sensing method for CDs (compact disks) and other optical disks. In this context, a coherent focused beam is reflected from the surface of the disk and detected in the far field. The interference pattern between the directly reflected beam ($0^{th}$-order) and the components diffracted by the optical data tracks (±1 orders) is detected by a split (two-element) photodetector to yield a highly sensitive tracking signal. ([1] Marchant, A. B., "Optical Recording: a technical overview," Addison-Wesley, 1990, pp. 172–178.)

Typically this approach has been applied to conventional optical disks, which are reflective. In this context, the push-pull signal results from the differing optical path length traveled by the light reflecting off the grooves and 'land'-relief pattern. These disks typically rotate while reading and writing, and the push-pull method is used to derive only a transverse ("off-track") one-dimensional position signal. Furthermore, these applications are generally restricted to beams with relatively large numerical apertures (NA) and relatively small spot sizes (SS), thereby limiting the range of focus and the field of view. For example, in a conventional application to a CD, NA>~0.4 and SS~1.7 µm.

Thus, there is a need for optical tracking methods that are applicable beyond conventional applications involving one-dimensional tracking in reflective media.

SUMMARY OF THE INVENTION

In one embodiment of the present invention, a method of determining coordinates for a storage medium includes: determining diffraction data from a plurality of diffraction patterns corresponding to diffractive markers of the medium; and combining the diffraction data to determine composite coordinates for the medium. According to one aspect, the composite coordinates include three translational coordinates and three rotational coordinates. According to another aspect, the act of determining diffraction data includes shining a plurality of beams on a selection of the diffractive markers, and measuring the corresponding diffraction patterns in one or more photodetectors to determine the diffraction data. In this latter case the photodetectors may be segmented. According to another aspect the act of combining the diffraction data to determine composite coordinates includes solving a matrix system that couples the diffraction data and the composite coordinates. According to another aspect, each diffractive marker includes a pit. According to another aspect, the storage medium includes a holographic storage medium.

In another embodiment of the present invention, a method of encoding position for a storage medium includes: adding a plurality of diffractive markers to the medium for marking locations of stored data; and adding a plurality of compound grooves between diffractive markers along a coordinate direction, each compound groove having a transverse groove type for encoding position across multiple compound grooves. This embodiment of the present invention may include aspects described above. According to another aspect, each diffractive marker includes a pit and each compound groove includes a plurality of pits. According to another aspect, the act of adding the plurality of diffractive markers includes etching the diffractive markers, and the act of adding the plurality of compound grooves includes etching the compound grooves. According to another aspect, the storage medium includes a holographic medium and the stored data includes holographic data. According to another aspect, position is encoded in a frame invariant manner with an LFSR (Linear Feedback Shift Register) code. According to another aspect, position is encoded with a cyclic frame invariant code.

In another embodiment of the present invention, a method of encoding position for a storage medium includes: adding a plurality of diffractive markers to the medium for marking locations of stored data; and adding a plurality of compound grooves between diffractive markers along a coordinate direction, each compound groove having internal interruptions for encoding position within that compound groove. This embodiment of the present invention may include aspects described above.

In another embodiment of the present invention, a method of encoding position for a storage medium includes: adding a plurality of diffractive markers to the medium for marking locations of stored data, the diffractive markers being arranged along a first coordinate direction and along a second coordinate direction; and adding a plurality of first compound grooves between diffractive markers along the first coordinate direction, each first compound groove having a transverse groove type for encoding position across multiple first compound grooves, and each first compound groove having internal interruptions for encoding position within that first compound groove; and adding a plurality of second compound grooves between diffractive markers along the second coordinate direction, each second compound groove having a transverse groove type for encoding position across multiple second compound grooves, and each second compound groove having internal interruptions for encoding position within that second compound groove. This embodiment of the present invention may include aspects described above.

In another embodiment of the present invention, a method of determining position on a storage medium includes scanning the medium in a transverse direction across a plurality of compound grooves that are aligned in a coordinate direction of the medium, each compound groove having a transverse groove type for encoding position across multiple compound grooves, wherein crossing a threshold number of compound grooves determines a position on the medium. This embodiment of the present invention may include aspects described above. According to another aspect, the act of scanning includes: shining a beam across the compound grooves; measuring corresponding diffraction patterns in segmented photodetectors to determine the diffraction data; and using the diffraction data to determine the position on the medium.

In another embodiment of the present invention, a method of determining position on a storage medium includes scanning the medium along a compound groove that is aligned in a coordinate direction of the medium, the compound groove having internal interruptions for encoding position within the compound groove, wherein crossing a codeword of interruptions determines a position on the medium. This embodiment of the present invention may include aspects described above.

In another embodiment of the present invention, a data storage system includes a storage medium for storing data at different locations in the medium, the medium including a plurality of diffractive markers for marking locations of stored data in the medium and a plurality of compound grooves for marking positions on the medium, each compound groove having a transverse groove type for encoding position across multiple compound grooves. This embodiment of the present invention may include aspects described above. According to another aspect, scanning across a threshold number of compound grooves determines a position on the medium. According to another aspect, each diffractive marker includes a pit and each compound groove includes a plurality of pits. According to another aspect, the storage medium includes a holographic medium and the stored data includes holographic data. According to another aspect, a constellation of diffractive markers indicates a location of a hologram. According to another aspect, a constellation of four diffractive markers indicates a location of a hologram. According to another aspect, wherein position is encoded in a frame invariant manner with an LFSR code. According to another aspect, position is encoded with a cyclic frame invariant code.

In another embodiment of the present invention, a data storage system includes a storage medium for storing data at different locations in the medium, the medium including a plurality of diffractive markers for marking locations of stored data in the medium and a plurality of compound grooves for marking positions on the medium, each compound groove having internal interruptions for encoding position within the compound groove. This embodiment of the present invention may include aspects described above. According to another aspect, scanning across a codeword of interruptions determines a position on the medium.

In another embodiment of the present invention, a method of encoding position information in a medium in a frame-invariant manner includes adding a plurality of markers to the medium for encoding position elements at the markers, the markers being arranged in a configuration so that a contiguous set of markers provides an encoded frame invariant position on the medium. This embodiment of the present invention may include aspects described above. According to another aspect, position is encoded with an LFSR code. According to another aspect, position is encoded with a cyclic frame invariant code.

In another embodiment of the present invention, a position addressing system includes a medium that includes a plurality of markers for encoding position elements at the markers, the markers being arranged in a configuration so that a contiguous set of markers provides an encoded frame invariant position on the medium. This embodiment of the present invention may include aspects described above.

BRIEF DESCRIPTION OF THE DRAWINGS

FIG. 2 shows a graph of x and y push-pull signals and the sum of the four sensors for an embodiment of the present invention.

FIG. 3 shows an idealized one-dimensional embodiment of the present invention.

FIG. 14 shows a portion of an embodiment for a disk layout that illustrates an independent 'grid' for each track.

FIG. 15 shows a frame invariant coding according to an embodiment of the present invention for the case n=5.

FIG. 16 shows a three-bit LFSR (linear feedback shift register).

DETAILED DESCRIPTION OF EXEMPLARY EMBODIMENTS

1. Two-Dimensional Push-Pull Position Sensing

Figure 1A:
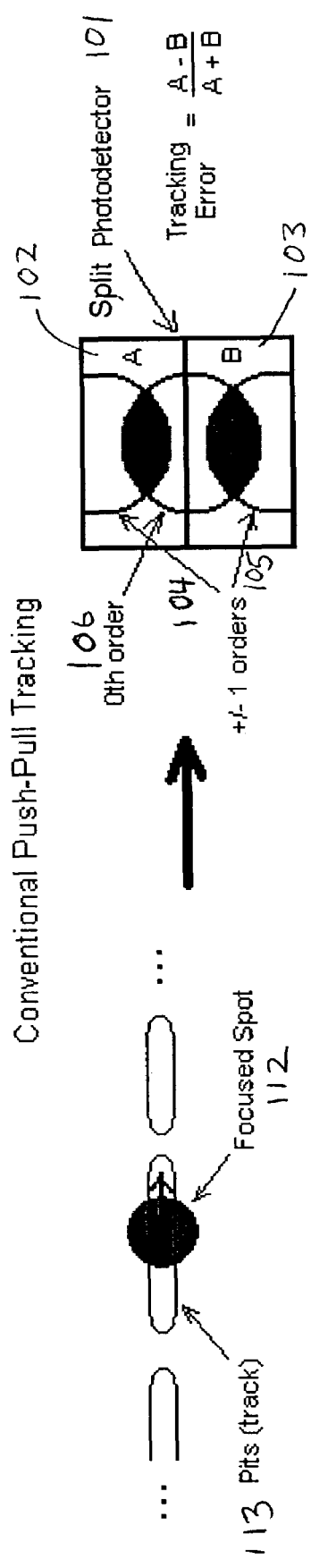
FIG. 1A shows a split photodetector capable of conventional one-dimensional push-pull position sensing.

FIG. 1A illustrates conventional one-dimensional push-pull position sensing. A focused spot 112 from a beam is shown in relation to a track 113 (or configuration of pits). A split photodetector 101 with two segments (A 102 and B 103) provides a tracking error that results from the offset of the $1^{st}$-order components 104, 105, with respect to the $0^{th}$-order component 106 at the split photodetector 101. The outputs of A and B are current-based measurements that reflect the light intensity at the detector segments.

Figure 1B:
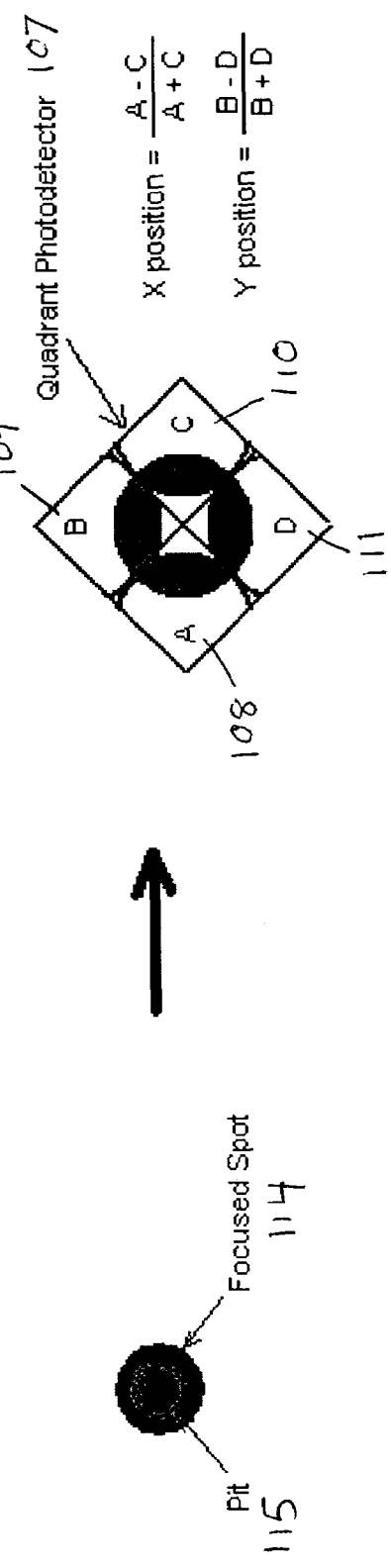
FIG. 1B shows a quadrant photodetector capable of two-dimensional push-pull position sensing as used in certain embodiments of the present invention.

FIG. 1B illustrates two-dimensional push-pull position sensing as used in certain embodiments of the present invention. Similarly as in FIG. 1A, a focused spot 114 from a beam is shown in relation to a single pit 115. A quadrant photodetector 107 with four segments (A 108, B 109, C 110, and D 111) provides an analogous two-dimensional tracking error that results from the offset of the $1^{st}$-order components with respect to the $0^{th}$-order component at the split photodetector.

Note that when the relief pattern is a single isolated track or pit, the diffracted pattern does not actually form welldefined "orders;" rather, it falls as the spatial Fourier transform of the track or pit convolved with the probe beam transform. The principles of operation for the two-dimensional method are similar to those for the one-dimensional case: shifting the pit relative to the probing spot causes a linear phase rotation in the far, Fourier plane of the diffracted component (e.g., the $1^{st}$-order components). The phase of the undiffracted component (i.e., the $0^{th}$-order component), meanwhile, is unaffected. The shift (position) induced phase rotation causes the interference between the diffracted and undiffracted components to become increasingly constructive on one side of the photodetector, whereas it becomes increasingly destructive on the opposite side. Thus, the sensor detects an intensity differential that is proportional to the position of the pit relative to the probing spot.

In an alternative embodiment for two-dimensional position sensing, the quadrant photodetector 107 in FIG. 1B is rotated 45° clockwise in the diagram above, and the position signals become $$X \text{ position} = \frac{(A+D)-(B+C)}{A+B+C+D}, \quad Y \text{ position} = \frac{(A+B)-(C+D)}{A+B+C+D}.$$

Typically, conventional push-pull tracking is employed with a reflective media using a relatively high numerical aperture beam (e.g., NA>~0.4). However, for applications to holographic media as described below with respect to certain embodiments of the present invention, much narrow beams can be employed (e.g., N.A.~0.05). This provides several advantages. First, the spot size, and therefore the linear range of position detection is larger (e.g., SS~20 μm vs. 1.7 μm for a CD), which is appropriate for positioning the relatively large hologram stacks. Secondly, larger spots lead to larger feature sizes in the relief pattern, so the scattering angle (SA) of other light off these features is low (e.g., SA>~1° causes less stray light). Third, a relatively narrow beam has a much greater depth of focus, obviating the need for a focus servo. Fourth, the relatively narrow beam is much easier to deliver in a device where numerical aperture is already at a premium (e.g., a holographic storage device). Fifth, a relatively narrow probe beams make is reasonable to contemplate use of multiple probe beams that sense several pits in close proximity independently.

2. Push-Pull Geometry and Resolution

Geometry considerations dictate that the numerical aperture of the probe beam (the width of the $0^{th}$ order) is large enough to subtend a large portion of the signal diffracted by the relief pattern. The diffracted light will diverge on the order of $\sim \lambda/d_f$ radians, where $d_f$ is the size of the smallest features in the relief pattern. Thus we need $\sin^{-1}(N.A.) \cong \lambda/d_f$ in order to get good overlap. Since we desire a 'large' linear region (many λs) for the position error signal, and also some insensitivity to z positioning errors (focus), we are led to consider low numerical aperture probe beams. Optimization of the geometry will not be derived here, instead we consider the following experimental test data for the quadrant detector 107 shown in FIG. 1B.

FIG. 2 shows the push-pull signals generated when an (approximately) gaussian probe beam with λ=658 nm, and $W_0 \cong 12$ μm ($W_0$ is the spot radius at the $1/e^2$ power threshold) was scanned in the y direction across a rectangular pit of y width 20 μm etched in 300 nm deep photoresist. A quadrant photodetector collects the light 50 mm away from the substrate. The x- and y-push-pull signals 201 and 202, and the sum 203 of the four sensors are plotted in the figure. The y plot 202 shows the characteristic "s-curve" of the push-pull signal.

The domain of the position sense signal is roughly ±5 V over ±10 μm. Suppose that the position signals are derived in analog and sampled with a 10-bit ADC, and that the peak-to-peak excursion of the y signal represents 80% of the full ADC scale. Suppose this is the limiting factor in resolution.[1] Then the resolution of the position error signal when operating in the linear range of ~±10 μm. is on the order $$\delta x \approx \frac{20 \ \mu m}{0.80(2^{10})} \approx 25 \ nm.$$

Geometric combination of three or more push-pull signals can be used to measure all six degrees of freedom (translation and rotation in x, y, and z) in the position of a holographic recording medium relative to the optical head. A plurality of

[1] Note that a more thorough treatment of resolution based on the underlying detector SNR would also depend on the sampling bandwidth. In the kilohertz regime, underlying detector resolution would certainly exceed this conservative estimate.

3. Six Axis Position Sensing probe beams interact with substrate relief features to produce independent push-pull x,y position error signals at spatially and angularly sampled intervals. The x,y errors are combined geometrically to deduce the error signals in the other axes.

4. Incorporating Multiple Probes

The extremely high resolution of the single probe method suggests that two independent position signals could be combined to yield position in other axes. If the probes impinge on separate pit shaped relief features 301 and 302 at differing angles, then differences in the measured x position will indicate movement in z.

FIG. 3 shows an idealized one-dimensional embodiment of the present invention, involving a holographic medium 305 and two quadrant photodetectors 306, 307. As shown in FIG. 3, there is a 15 mm distance between the medium 305 and photodetectors 306, 307. The two pits 301 and 302 (separated by 1 mm) and two probe beams 303 and 304 (with probe angle 5.7°) otherwise have the same parameters as in the above discussion with respect to FIG. 2.

Figure 4:
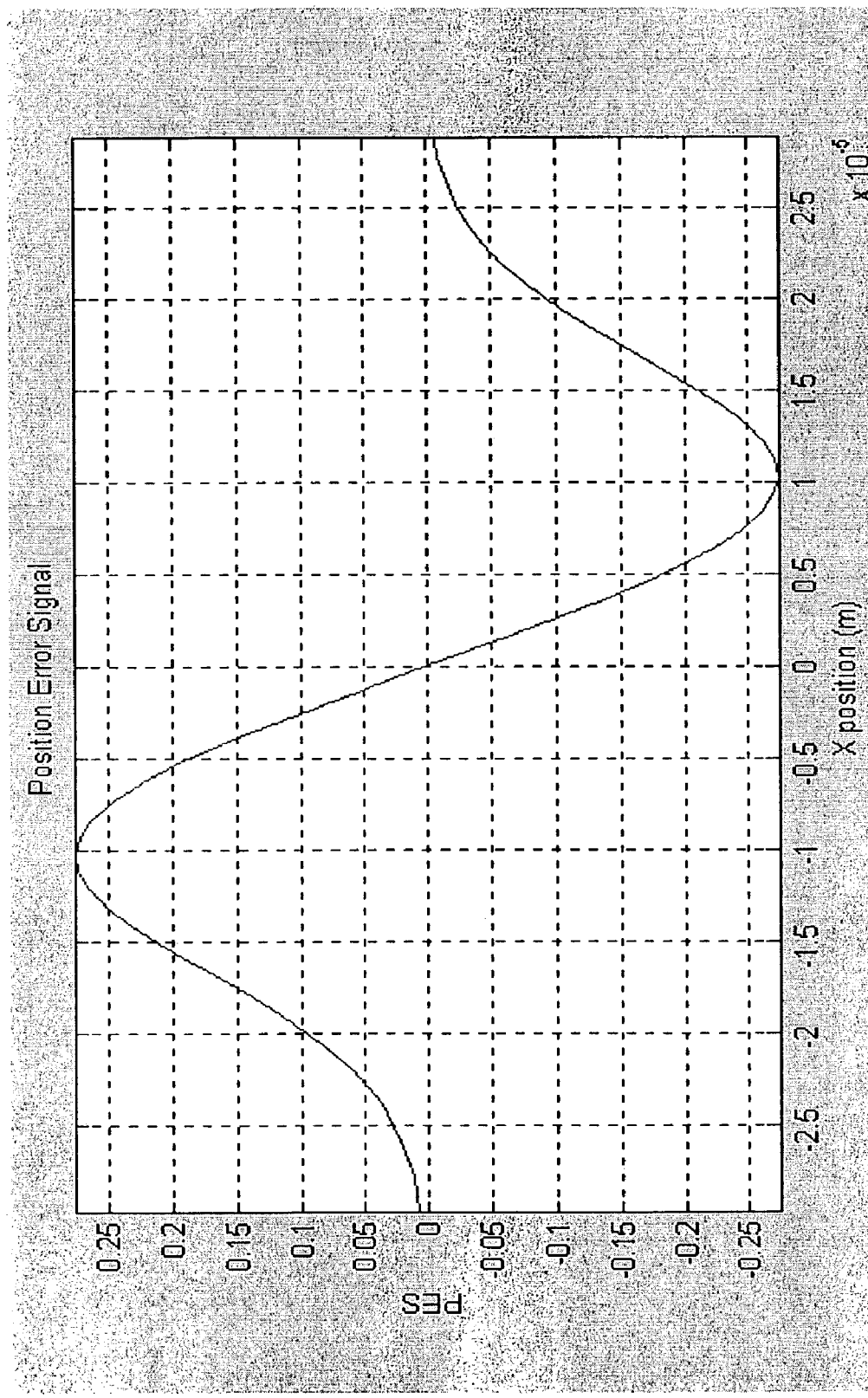
FIG. 4 shows a graph of a computer simulation of the embodiment shown in FIG. 3.
Figure 5A:
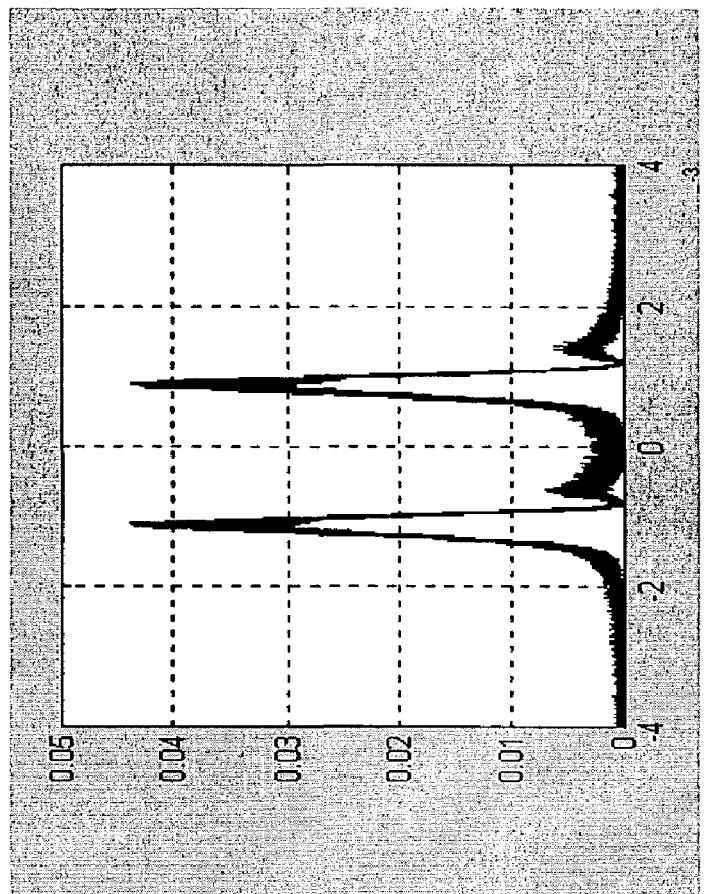
FIG. 5A shows a computer simulated detector intensity distributions at x=0 μm, corresponding to the computer simulation of FIG. 4.
Figure 5B:
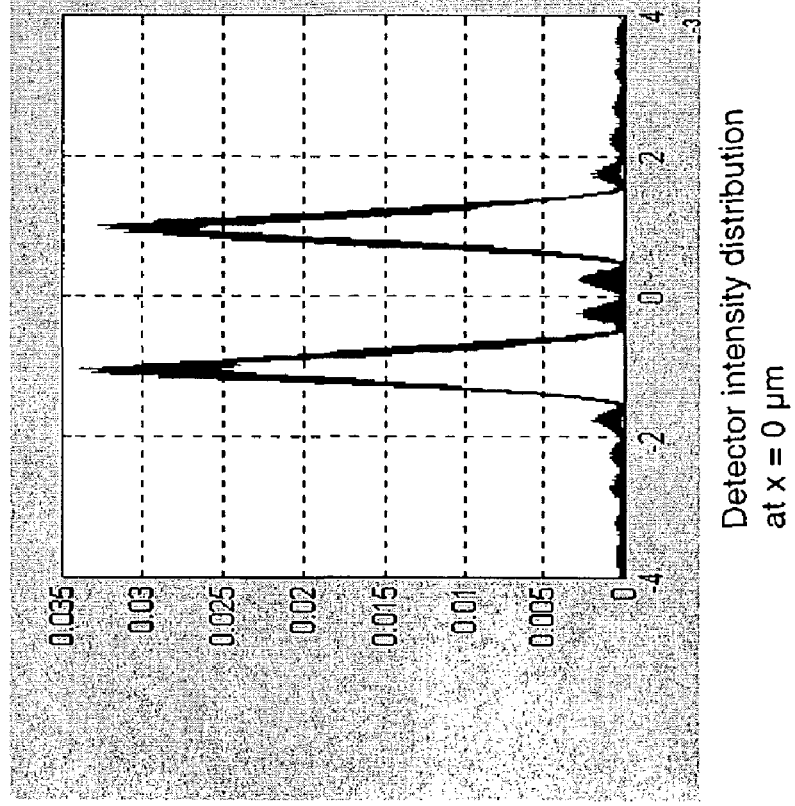
FIG. 5B shows a computer simulated detector intensity distributions at x=−10 μm, corresponding to the computer simulation of FIG. 4.

This configuration acts as two independent single-probe systems except for the fact that some diffracted components of each probe will reach the detectors for the other probe and interfere coherently. However, the angular difference between the interfering components will be about (1 mm/15 mm) radians=3.8°, so the beat period between them is $\lambda/\sin 3.8° \cong 10$ μm, which is much too small to have a large effect over the 1 mm pixel size. As illustrated in FIG. 4, a computer simulation of the above geometry confirms this intuition; the combined position error signal (PES) (i.e., the average of the two sensors) looks uniform and linear. FIGS. 5A and 5B respectively show the corresponding computer simulated detector intensity distributions at x=0 μm and x=−10 μm.

As illustrated by the above example, we can expect that multiple probes indeed act independently provided they have a modest spatial and angular separation. Multiple probes provide x position sensing redundancy in case, for example, one of the pits, is damaged or blocked by a contaminant. Furthermore, the angular separation allows for detection of the substrate position along z. In FIG. 3 above, suppose that the substrate is repositioned. Δz lower. In this case, the beam 304 from the right pit 302 would detect a position error of $+\tan(5.7°) \Delta z$, and the beam 303 from the left pit 301 would indicate $-\tan(5.7°) \Delta z$ [superscripted degrees ...]. Thus, the difference in the detected x positions indicates an error in the z direction (focus). The resolution of measurement in the z direction is approximately $$\delta z \approx \delta x / \tan(5.7°) = 10 \delta x.$$

Thus, we can expect about an order of magnitude lower resolution along z than along x (or y) in the described geometry. However, this is still a fraction of a wavelength. It is also reasonable to consider larger probe angular separations.

5. Six Axis Detection

Figure 6:
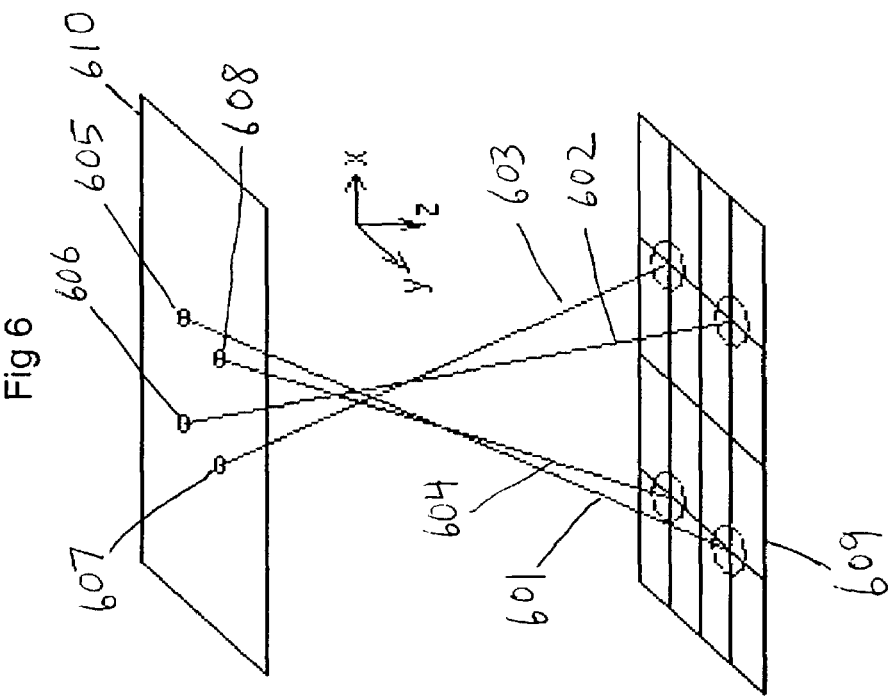
FIG. 6 shows a two-dimensional generalization of the embodiment shown in FIG. 3.

FIG. 6 illustrates a two-dimensional generalization of the embodiment shown in FIG. 3. Here, four probe beams 601, 602, 603, and 604 interact with four stack markers 605, 606, 607, and 608 (on a holographic medium 610), and then impinge on a four-by-four element photodetector 609 (or four separate quadrant detectors). Since the individual probes are effectively independent, we can consider a set of four separate x,y position measurements. FIGS. 7A–7F illustrate the apparent direction of motion detected by the four probes when the substrate is moved in each of the six possible degrees of freedom.

Figures 7C, 7F:
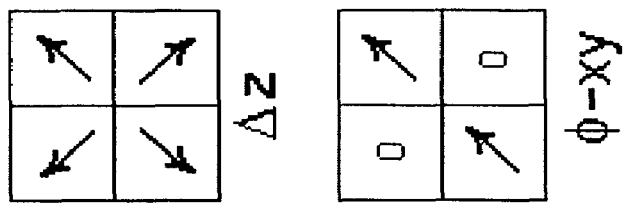
FIGS. 7A–7F illustrate the apparent direction of motion detected by the four probes in the embodiment of FIG. 6 when the substrate is moved in each of the six possible degrees of freedom.
Figures 7B, 7E:
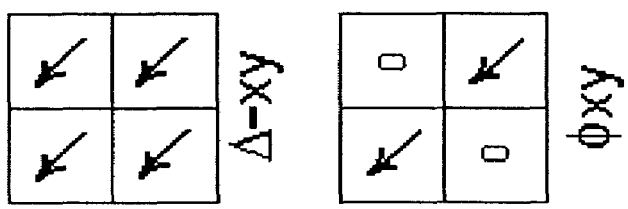
Figures 7A, 7D:
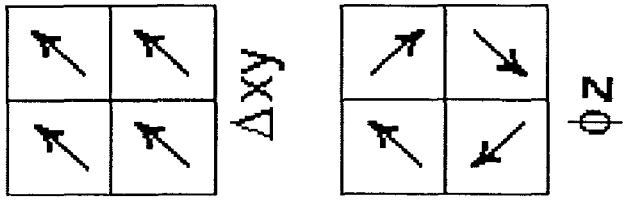

In FIG. 7A translation along the x=y axis ($\Delta xy$) is directly detected as a common xy motion by all four quadrant detectors. Similarly, in FIG. 7B translation along the x=−y axis ($\Delta -xy$) can be directly detected. In FIG. 7C translation along the z axis ($\Delta z$) is indirectly detected by an apparent spreading or shrinking of the four-pit pattern. In FIG. 7D rotation about the z axis ($\phi z$) is directly observed as a rotation of the pit pattern. In FIGS. 7E and 7F, rotations about the x=y and x=−y axes ($\phi xy$ and $\phi-xy$) are indirectly inferred from an apparent motion of diagonally opposite pits.

Figure 8:
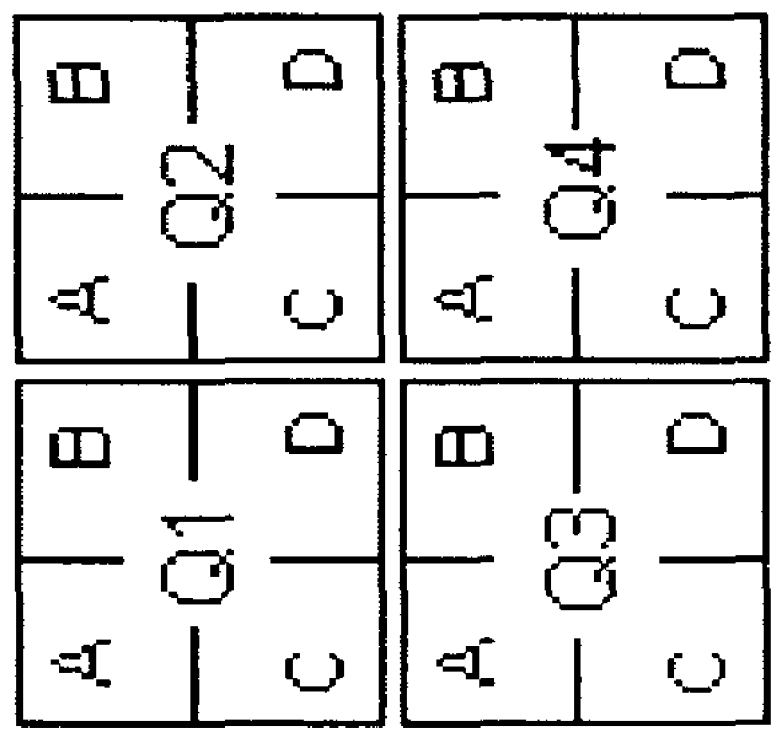
FIG. 8 shows the quadrant detectors and their segments from the embodiment of FIG. 6.

In FIG. 8 the quadrant detectors in the four-by-four element photodetector 609 of FIG. 6 are denoted as Q1, Q2, Q3, and Q4, and their segments are labeled A, B, C and D (as is conventional). Then we can write expressions for the six composite position error signals by inspection:

$$\Delta xy = Q1(B-C) + Q2(B-C) + Q3(B-C) + Q4(B-C)$$

$$\Delta -xy = Q1(A-D) + Q2(A-D) + Q3(A-D) + Q4(A-D)$$

$$\Delta z = Q1(A-D) + Q2(B-C) + Q3(C-B) + Q4(D-A)$$

$$\Phi z = Q1(B-C) + Q2(D-A) + Q3(A-D) + Q4(C-B)$$

$$\Phi xy = Q1(A-D) + Q2(D-A) + Q3(D-A) + Q4(A-D)$$

$$\Phi -xy = Q1(C-B) + Q2(B-C) + Q3(B-C) + Q4(C-B).$$

In the above expressions, normalizing and trigonometric scaling factors have been omitted. The resolution of each of these measurements, roughly estimated by the method above, becomes:

$$\delta xy = \delta -xy \approx \delta x/4 = 6 \text{ nm}.$$

$$\delta z \approx 10 \delta xy = 60 \text{ nm}.$$

$$\phi z \approx \delta xy / 1 \text{ mm} = 6 \text{ } \mu\text{rad}.$$

$$\phi xy = \phi -xy \approx \delta z / 1 \text{ mm} = 60 \text{ } \mu\text{rad}.$$

Clearly, this method could be adapted for a different number of probe beams. At least three are needed to provide the ability to measure all six degrees of freedom; higher numbers will provide redundancy (and corresponding error reduction).

6. Delivering Multiple Probes

In practice, we may wish to deliver the probe beams through optical elements designed for one of the holographic optical paths. If the probes come through the reference beam path, for example, we are faced with the challenge of fashioning wavefronts that pass through reference path lenses, arrive at four separate sharp foci in the plane of the medium, and then diverge onward to form round spots on the four detectors. One method to achieve this is to employ a holographic optical element (HOE).

Figure 9:
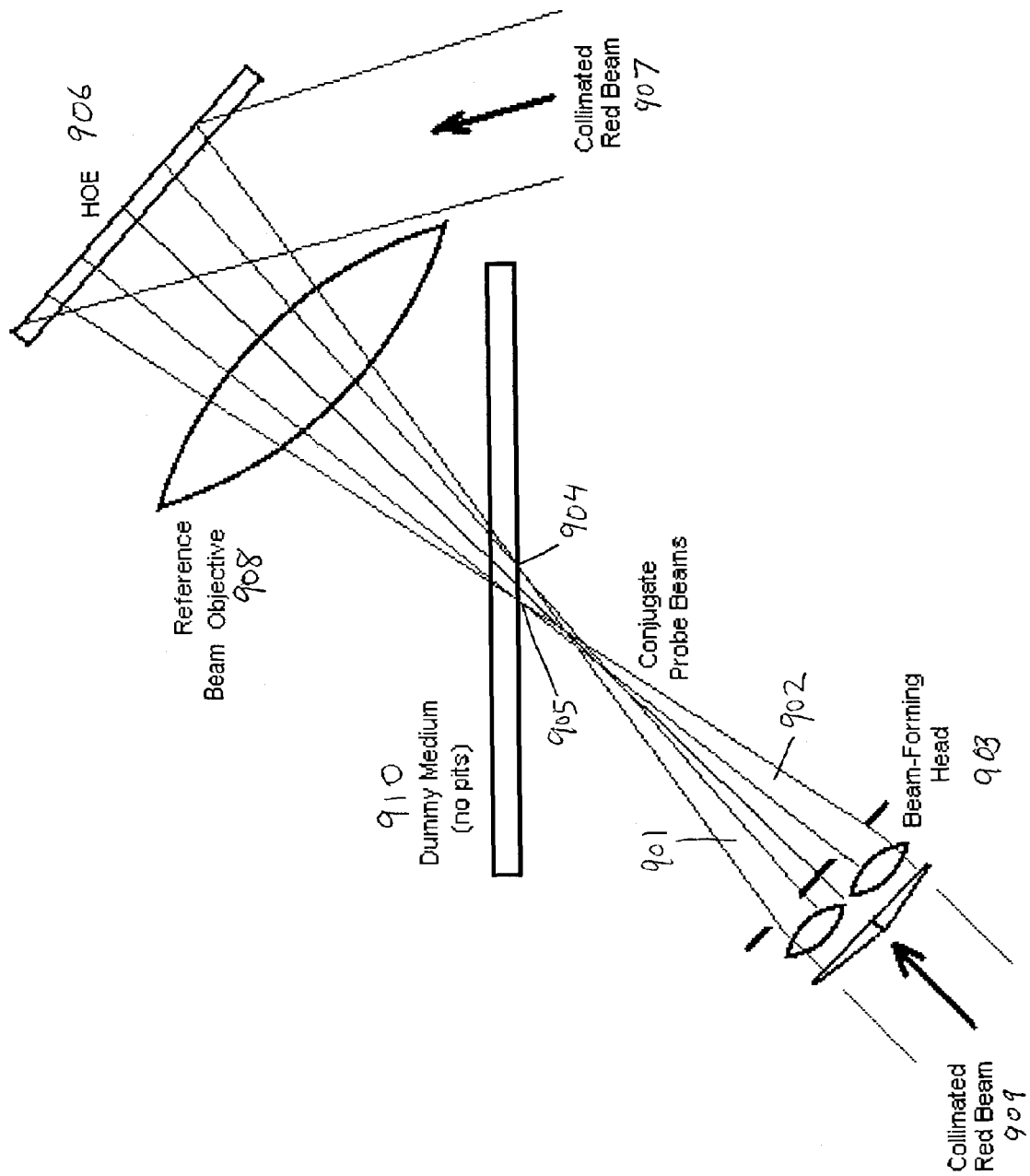
FIG. 9 shows an embodiment of a setup for recording an HOE (holographic optical element).

FIG. 9 shows an embodiment of a setup for recording the HOE. In this scheme, conjugate (backwards propagating) versions of the desired probe beams 901, 902 are created using a four-lens beam-forming head 903 and a collimated red beam 909. The head is aligned to precisely create the four focused spots 904, 905 on the bottom of a blank substrate (i.e., a "dummy medium with no pits"). The beams then propagate upwards through a replica of the reference beam objective 908. At the HOE 906, a collimated reference red beam 907 interferes with the conjugate probes, recording the resulting wavefront. The HOE is thick enough to exhibit wavelength dependant Bragg selectivity and high diffraction efficiency.

In the assembled drive, a collimated red beam (the conjugate of the reference beam used to record the HOE) is introduced into the reference arm. The fringes in the HOE diffract this beam into a counterpropagating replica of the recorded probes. All wavefront distortions and aberrations are undone as the beams pass back through the optics and medium. They arrive at four clean foci on the bottom of the substrate. From there they continue on to form four perfect round spots centered exactly on the quad detectors.

Since the HOE is not Bragg matched to the blue (or perhaps green) reference beam, it acts simply as a flat optical plate. Its presence can be accounted for during the design of the scanner and then duly ignored.

An alternative strategy would entail manufacturing a computer-generated HOE (e.g., a diffractive optical element, or DOE) that produces the desired probe beams. Computer programmed descriptions for the desired input and output wavefronts, along with prescriptions of the optical elements in the path are used to compute the profile of, for example, a blazed phase grating that performs the desired diffractive operation. Such DOE technology is commercially available. In this case, the area of the DOE where the reference beam passes must be kept free of grating fringes since surface relief gratings are not wavelength selective.

The information gleaned from six-axis sensing can be used in several ways. Foreknowledge of tilt and focus errors could be used to optimize channel algorithms, or to offset the reference angle. Micro-actuators (based, for example, on the piezoelectric effect or thermoelectric expansion of a structural member) could be used to correct the errors. At the very least, data could be collected to establish the operating margins of a design.

Future multiplexing and detection methods (e.g., correlation multiplexing and homodyne detection) are likely to require sub-wavelength positioning accuracy to achieve performance benefits. Sensing techniques that support this accuracy will be prerequisite for obtaining these benefits.

7. Absolute Address Determination and Seek Feedback

The push-pull method provides a fine position signal in the vicinity of a pit, but it does not indicate which pit is being probed (absolute address), or help in finding individual pits which preferably cover the media surface very sparsely. Furthermore, a mechanism is required whereby position information is made available for servo feedback during seek operations. The problem of absolute position determination is addressed by adding a network of "compound grooves" to the relief features etched on the medium. What follows is described assuming a disk-shaped medium, although it could clearly be adapted to suit another form (e.g., card-shaped). Also, this discussion describes using a single beam for determining radiae and tangential push-pull signals that are used to decide the addressing information. More generally, multiple beams could be used in correspondence to the above discussion involving multiple beams.

Figure 10:
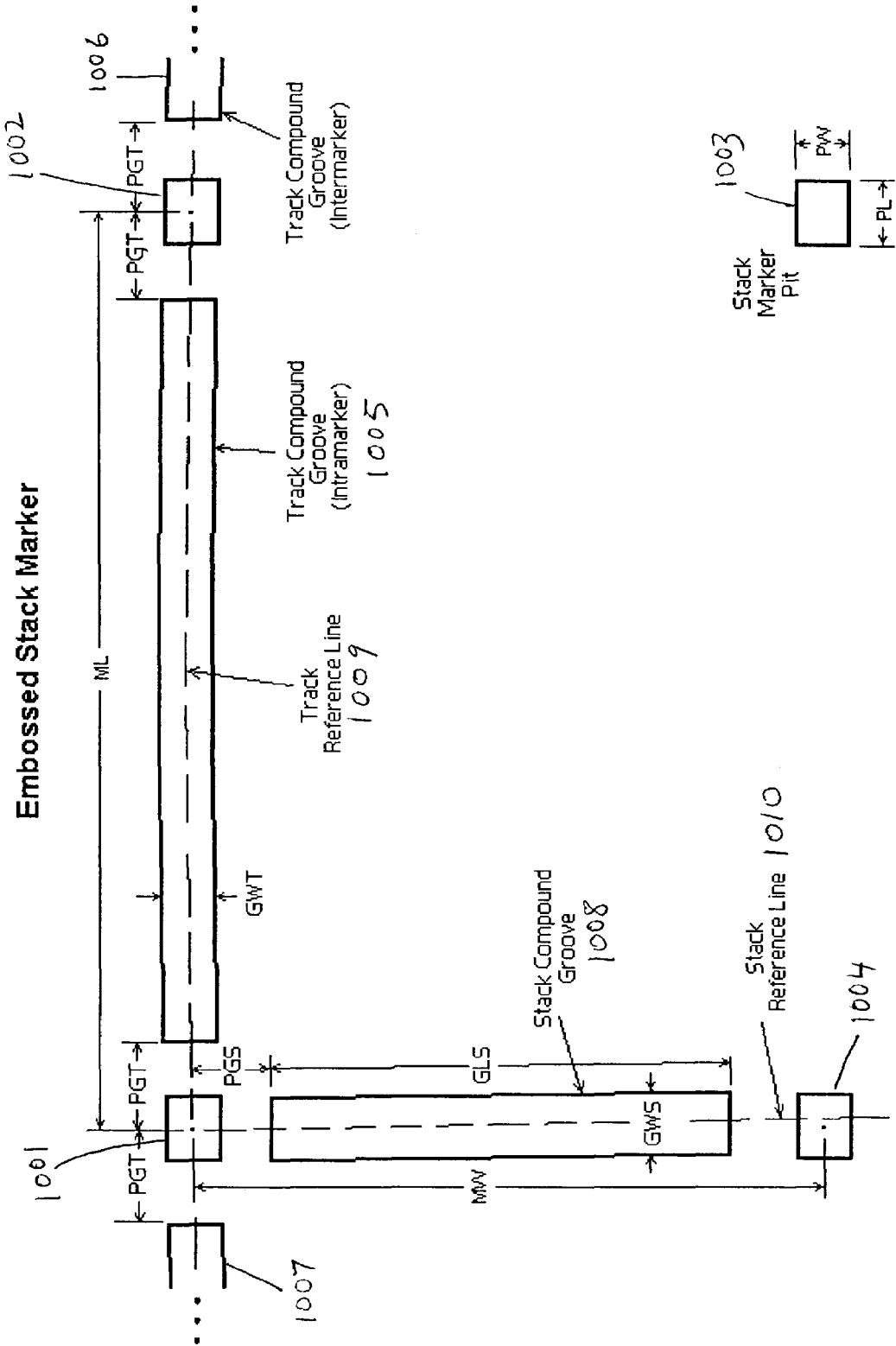
FIG. 10 shows an embodiment of a tracking pattern for a single hologram stack.

FIG. 10 shows an embodiment of an embossed stack marker that provides a tracking pattern for a single hologram stack. The width of the grooves and pits is greatly exaggerated in the diagram for clarity. For example, in one specifically preferred embodiment, the distance marked ML is ~2 mm, whereas the widths PW and GWT are only ~20 μm. Other dimensions marked in FIG. 10 include PGT (~70 μm), PGS (~55 μm), PL and GWS (both ~26 μm), GLS (~1.5 mm) and MW (~1.6 mm).

The four stack marker pits 1001, 1002, 1003, and 1004 represent the locus of the four probe beams when positioned on a hologram stack center, as described in the preceding section. The track compound grooves 1005, 1006, and 1007, and stack compound groove 1008 are features added for identifying and seeking between stack markers. As a reference for tracking purposes, a track reference line 1009 and a stack reference line 1010 are shown. All features have the same depth (preferably 240 nm so that they induce λ/4 phase delay in the probes in order to produce the maximum push-pull signal), but the compound grooves have internal structure that is used for addressing. All features are etched into the medium surface with a lithographic or molding process. Preferably, they are molded using conventional compact disk or DVD mastering processes.

Figure 11:
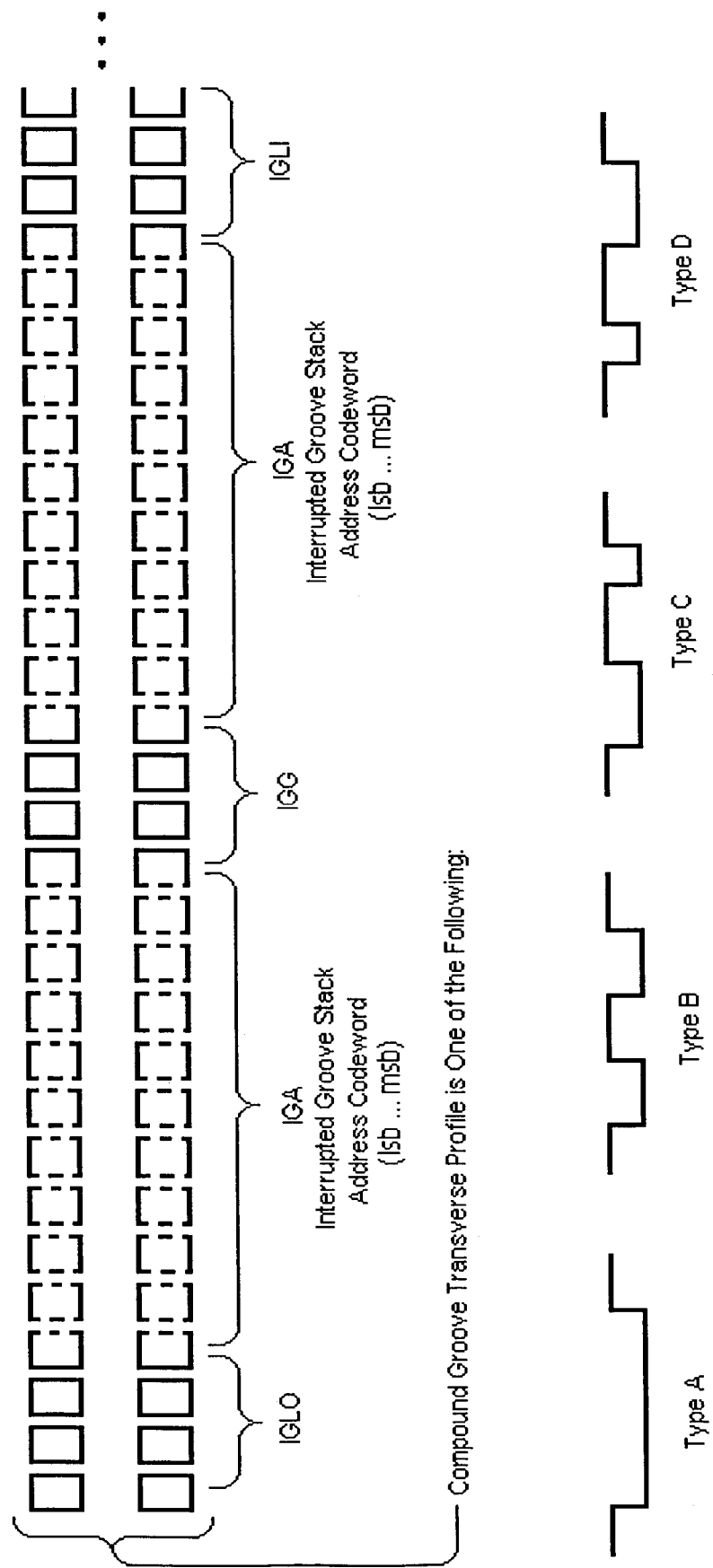
FIG. 11 shows an embodiment of a compound groove where the component grove transverse profile is "Type B" from the four possible types shown.

FIG. 11 shows an embodiment of a compound groove where the component grove transverse profile is "Type B" from the four possible types shown. The overall width of each compound groove type is the same (e.g., 20 μm); but type A is a single groove, type B is composed of two 6 μm wide subgrooves, and types C and D have constituent subgrooves of 8 μm and 4 μm width.

The compound grooves have internal structure. They are comprised of individual pits and elongated pits (or simple grooves) that allow them to encode absolute address in two separate manners: the compound groove transverse profile encodes address information for coarse (groove crossing) seek operations; and the interrupted groove stack address codewords provide address information for fine (groove following) seek operations.

The axes of the x and y push-pull signals are aligned to the groove orientations. The differential nature of the push-pull method causes the channels to react only to spatial frequency components that have a component along their respective axes. Thus, for example, when a probe is located in the vicinity of a stack groove, the x channel will react primarily to the transverse groove profile, and the y channel will react primarily to the pattern of groove interruptions. The relief pattern within the compound grooves has been designed to take advantage of this separability. In particular, the groove interruptions are large enough so that they produce a significant signal in the longitudinal direction, but small enough that they do not substantially reduce the diffraction strength of the groove profile in the transverse direction. This effective orthogonality allows the controller to interpret the channel-wise information independently.

The above-described embodiments can be generalized. For example, the pits in FIG. 10 can be replaced by more general diffractive markers that provide a diffraction signature. These diffractive markers may have a relatively simple pit-like structure or have more complex substructures. Furthermore, those diffractive markers may be sub-surface locations as well as surface locations. Similarly, the compound grooves may also be generalized in ways understood by those skilled in the art.

8. Groove Following and Detection of Groove Interruptions

When following a stack compound groove, the x channel is transverse and responds to the transverse compound groove profile. This represents the distance away from the groove center (or one of the subgroove centers) when operating within the linear range of the transverse s-curve. This channel can thus be used as a tracking error signal for following the groove. The y channel, on the other hand, is longitudinal with respect to the groove and responds to the groove interruptions. Each interruption will produce a small (inverse) s-curve, allowing the controller to decode the stack address codeword bit sequence. As indicated in FIG. 11, a codeword sequence is preceded by a fixed-frequency lead-in pattern, IGLI; followed a first parity-protected codeword, IGA; a fixed-frequency gap pattern, IGG; a second parity-protected codeword, IGA; and finally a fixed-frequency lead-out pattern, IGLO. (The groove in FIG. 11 would typically be scanned from right-to-left.)

Figure 12:
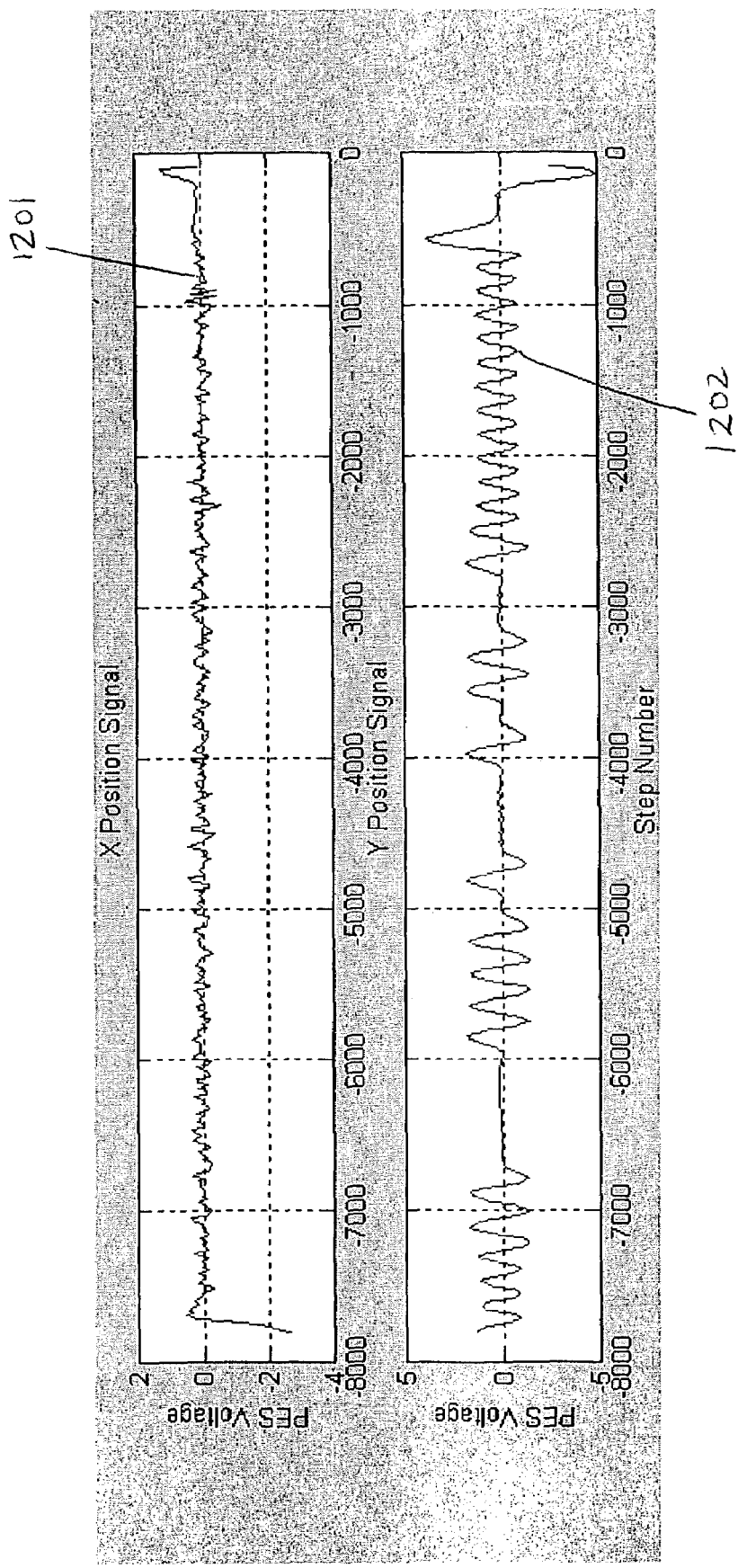
FIG. 12 shows experimental data collected during a stack compound groove following test for the embodiment shown in FIG. 11.

FIG. 12 shows experimental data collected during a stack compound groove following test for the embodiment shown in FIG. 11. This plot shows the probe beam scanning upwards from approximately the middle of a stack compound groove and ending within the linear section of the stack marker pit. The x signal 1201 represents the groove tracking error and is driven to near zero by the groove following servo. The y signal 1202 shows the s-curves of each individual groove interruption; in this case a negative going zero crossing indicates the center of the interruption. A 22-bit stack address codeword was scanned in the process; the controller was able to correctly decode the address by timing the negative zero crossings.

9. 'Ballistic,' Groove Crossing Seek Operations

It is also desirable to determine and verify position while moving without having to follow a groove. For example, a long seek operation will be performed more quickly if the seek is able to take a direct path by moving both the angular and radial axes simultaneously. The mechanical motion for a seek can be performed most quickly when position feedback is available to close a servo loop. In this case, the probe beam will cross a plurality of grooves obliquely, and the entire push-pull s-curve of each groove scans across the detector channel that is transverse to the groove.

Figure 13A:
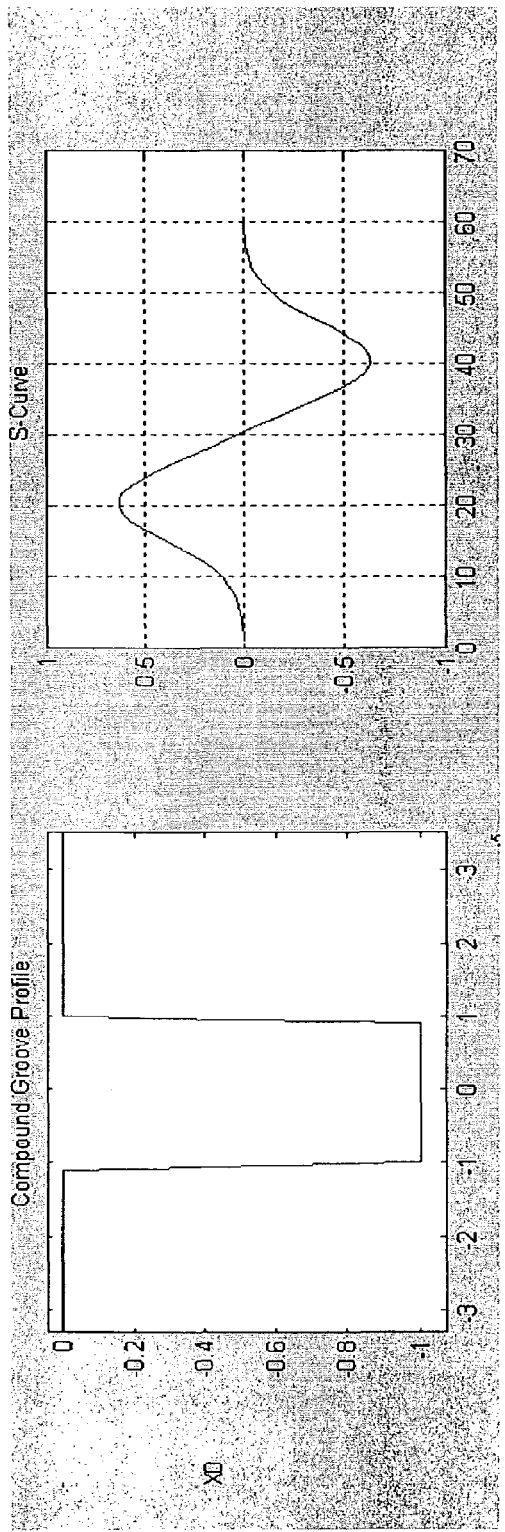
FIGS. 13A–13D show the computer simulations illustrating four different compound groove profiles and their resulting s-curves in correspondence to the four types illustrated in FIG. 11.
Figure 13B:
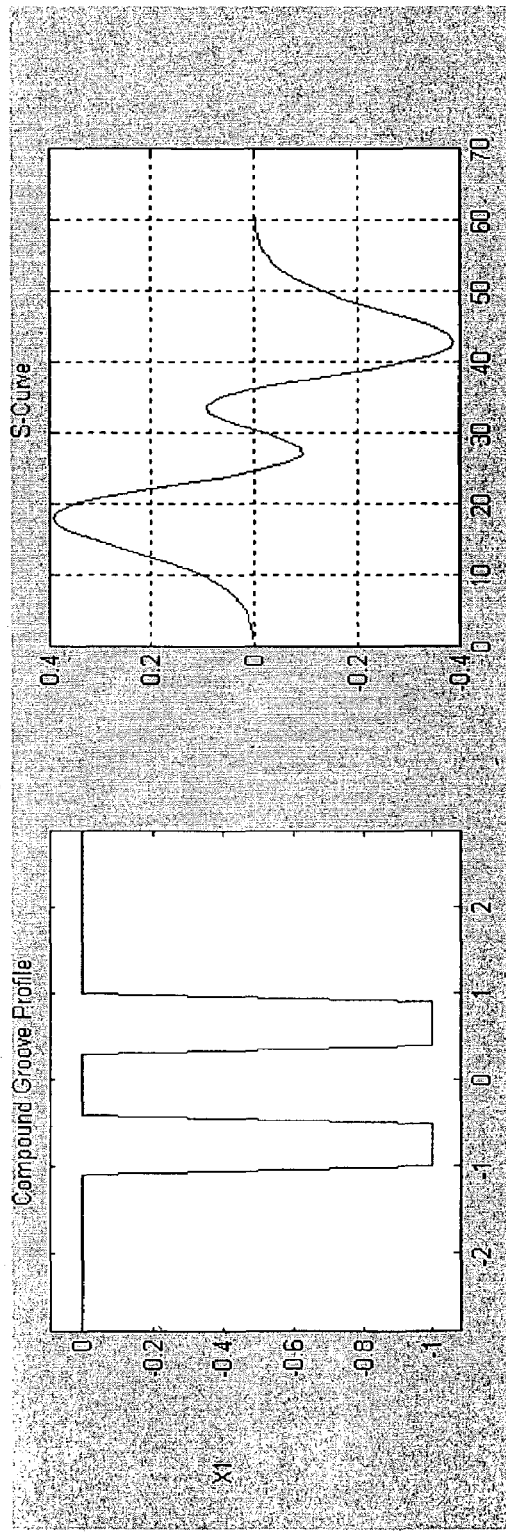
Figure 13C:
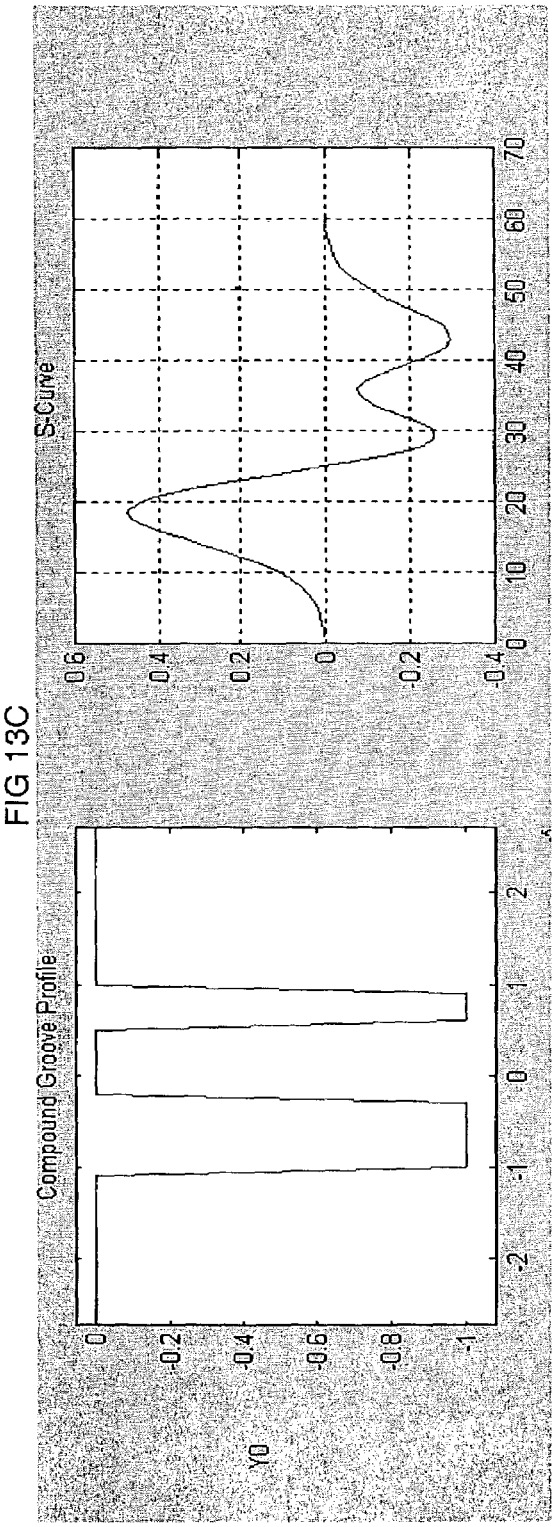
Figure 13D:
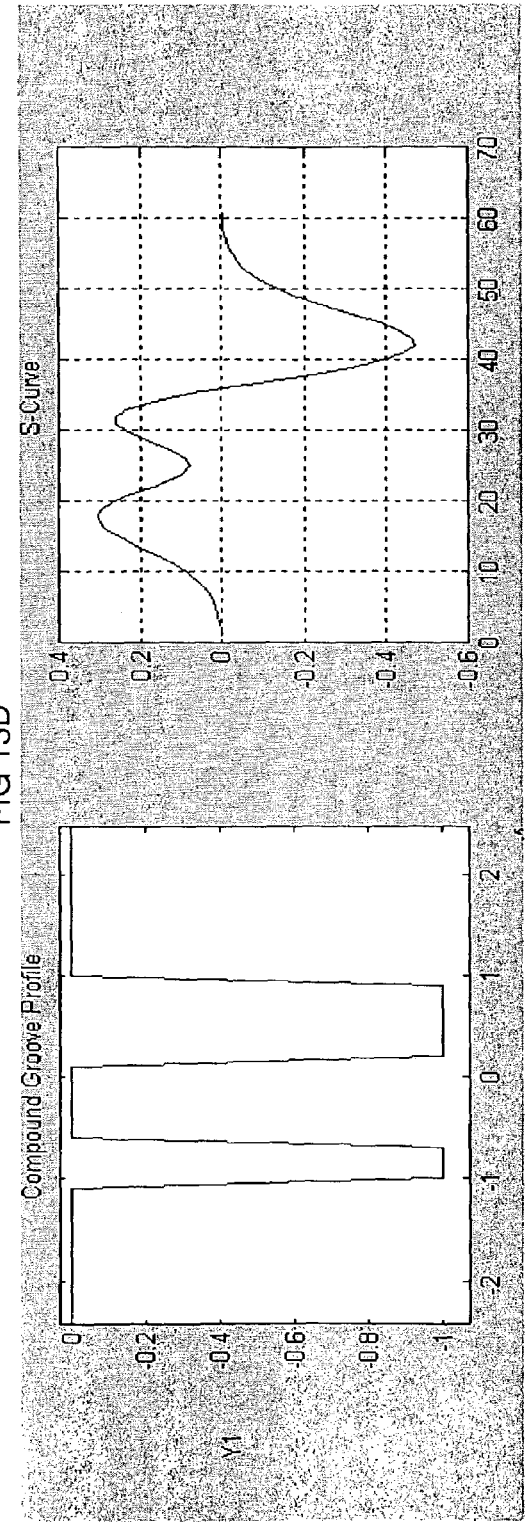

Because of this, a pair (or larger number) of closely spaced grooves can be distinguished from a single groove. If a small set of such closely spaced "compound grooves" is utilized, then determination of which type of compound groove has been crossed can convey a small amount of information. For example, the computer simulations in FIGS. 13A–13D show four different compound groove profiles and their resulting s-curves in correspondence to the four types illustrated in FIG. 11. That is, FIG. 13A shows the compound groove profile for type A in FIG. 11, FIG. 13B shows the compound groove profile for type B in FIG. 11, FIG. 13C shows the compound groove profile for type C in FIG. 11, FIG. 13D shows the compound groove profile for type D in FIG. 11.

The total width of each compound groove is on the order of the spot size. It is also desirable to optimize the groove parameters for detection robustness so that, for example, the pair-wise RMS difference between any two s-curves is maximized.

If the probe crosses a groove obliquely, then the compound groove profile will scan across the transverse push-pull channel, and the longitudinal channel may or may not exhibit a response due to the presence of groove interruptions. However, since the groove interruptions have been designed to produce a lower magnitude response (they are substantially smaller than the spot size), the orientation of the groove can be determined with high probability. Furthermore, signal matching algorithms (e.g., RMS error calculation), knowledge of travel direction and speed, previously know address information and other contextual knowledge will allow the controller to distinguish compound grooves from spurious signals due to surface flaws, stack marker pits, and contaminants.

This alphabet of four groove types allows one to design a code that uniquely indicates location on the disk. For example, suppose that the disk is rotated with a push-pull probe at a constant radius so that it scans the stack compound grooves on a track in sequence. Suppose that the groove types A, B, C and D are assigned binary values 00, 11, 10, and 01 respectively. As grooves are scanned in sequence, the detected binary values can be concatenated to build up an absolute address. Similarly, the track compound grooves can be used to encode track position information. A specific method of encoding is described below in the section Frame Invariant Coding.

In practice it will be undesirable to format a disk in a manner where the holograms are laid out on a grid. This would prove wasteful since the inner tracks have much less recording area than the outer tracks, even for 'zoned' recording. One solution is to provide an independent 'grid' for each track.

FIG. 14 shows a portion of an embodiment for an embossed disk pattern that illustrates this concept. Here stack compound grooves 1401 and track compound grooves 1402 are represented by dark lines, and stack marker pits 1403 are represented by dots (cf. FIG. 10). Track boundaries 1404, which are represented by dotted lines, indicate separation between internal hologram storage location (and not surface markings). The track compound grooves from neighboring stack markers join to form continuous concentric circles, but the stack markers from adjacent tracks are not aligned. This results from filling each track with the maximum number of hologram stacks.

10. Frame Invariant Coding

Since there may be up to several thousand hologram stacks on a disk, a plurality of compound grooves will be required in order to uniquely determine position. A contiguous sequence of compound groove types will be collected in order to build a position codeword, which is then decoded to determine disk position. Many codes exist that could achieve this, however it is desirable to minimize the number of grooves required to encode the address. A typical address word will consist of n bits, lsb . . . msb, arranged in a frame. If the encoded address is thus frame-oriented, then the controller will, on average, have to discard half a frame of grooves before it can start collecting a frame-justified codeword. Typically there is even more overhead to delineate the frames. A preferable solution is to use a frame invariant coding scheme wherein any n grooves in sequence can be decoded into a disk address, so that the code rate is 1.0. This is most easily illustrated for the case where each groove codes a single bit, but the concept can be extended to two bits per groove or even more.

It is apparent that a frame invariant code must have the property that adjacent disk addresses share n−1 bits. That is, the codeword for address x must be a bit-shifted version of the codeword for address x+1. FIG. 15 illustrates this for the case n=5, with compound grooves 1501 and pits 1502, 1503, 1504. Here pit x 1503 provides the rightmost address bit for address x 1505, and pit x+1 1504 provides the rightmost address bit for address x+1 1506. The addresses are decoded approaching from the left. It is clear, however, that approaching from the right will simply cause a codeword bit reversal, and a remapping of the codewords to the disk addresses.

Frame invariant codes are known in the prior art. One such family of codes is based on a linear feedback shift register (LFSR). ([2] http://www.edatoolscafe.com/Book/CH14/CH14.7.htm, downloaded Jan. 22, 2002.) These devices are used to generate pseudo-random bit sequences, and to implement finite-field math operations. Consider the three-bit LFSR 1601 shown in FIG. 16.

The device shown in FIG. 16 produces the pseudo-random sequence 7, 3, 1, 4, 2, 5, 6 (length=$2^3-1$) on the outputs Q0 . . . Q2 as it is clocked. By design, the codewords are shifted versions of the previous codeword, where the new low bit (Q0) is determined by an exclusive-or feedback function of the higher bits. The position of the feedback taps can be represented as a binary-coefficient polynomial called a characteristic polynomial. In general, an LFSR of this form will produce a maximum length sequence (length $2^n-1$) if the characteristic polynomial is a "primitive" polynomial. The present invention uses these sequences for determining frame-invariant recording medium address codes. If, for example, a medium is formatted with 1648 hologram stacks, then the frame invariant address codewords will require at least 11 bits ($2^{11}-1=2047$, >1648).

On a circular medium such as a disk, another issue arises because the tracks wrap around continuously to their starting point. Address codewords that straddle the wrap boundary must also be considered. This can handled by finding cyclic frame-invariant sequences within a LFSR pseudo-random sequence, by adding exception cases to the LFSR rules to generate cyclic sequences of the correct lengths, or just by tabulating the wrap cases and handling them as exceptions in firmware. In yet another embodiment, groove sequences that straddle the wrap boundary can be detected by altering the groove spacing over the boundary. For example, if the separation between the first and last stack compound grooves on a track is 33% greater than the separation between all other neighboring pairs, then the controller will be able to distinguish groove sequences that include the wrap boundary by the fact that one of the intervals between detected grooves is 33% longer than the others.

Furthermore, cyclic frame-invariant sequences can in fact be synthesized for any cycle length, n (i.e., number of stacks on the track), by the following process: Take a longer LFSR-generated codeword sequence, then perform a computer search to find a subsequence of length n that is cyclically frame-invariant.

This process must find a solution for the following reason: an LFSR can produce $2^n-1$ different sequences of length $2^n-1$, depending on its starting state. However, all of these sequences are just rotated copies of each other (the cycle starts and ends from a different point). During each of these sequences, the LFSR must necessarily take on all $2^n-1$ possible non-zero state values.

The LFSR is linear under the rules of binary polynomial addition. Therefore, the difference between any two sequences is also a possible sequence—i.e., a rotated copy of either of the original sequences. In particular, the difference between a sequence and itself rotated by n+1 positions is also a possible sequence. Since every sequence assumes all non-zero values once, then this difference sequence must—once and exactly once—assume the value of one. This means that two codewords can be found separated by n+1 positions that differ in only the least significant bit. It therefore follows that the subsequence from the first codeword to the codeword preceding the second codeword forms a cyclic frame-invariant sequence of length n. This is because this preceding codeword can form either of the two original codewords by shifting one bit towards the msb; the $n+1^{th}$ codeword sets the new lsb according to the feedback rule; the first codeword simply complements it.

11. Other General Advantages

The present invention may additionally provide other advantages for holographic data storage depending on the operational setting and the specific embodiments employed.

First, no disk area must be set aside for positioning information. Instead a low-impact relief pattern coexists with the useable recording area. This is especially important in the high-density recording regime where neighboring hologram stacks share a large amount of media surface due to the thickness of the medium substrates and the high spatial bandwidth of the recording signals. It is not possible to simply put servo marks "between" the holograms.

Secondly, the overall density of relief patterns on the disk surface is very low. This limits the overall scattering of the object and reference beams, compared to, say, a dense grating pattern on the medium surface. Furthermore, large "windows" of unetched substrate can be reserved that can pass the entire object or reference beam undisturbed (cf. FIG. 14).

Third, the lasers and detectors needed for enabling the above embodiments are relatively cheap and typically ship in volume for the CD and DVD industries (e.g., 635 nm semiconductor lasers and quadrant photodetectors made for DVD players).

Fourth, the relief pattern consists only of single-depth etched areas and may be mastered and manufactured by conventional CD and DVD techniques.

Fifth, the probe beam wavelength can be chose so that it does not interact with the photosensitive medium.

Finally, the present invention can be applied to more general storage media (e.g., nonholographic) for indexing storage locations.

Although only certain exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method of encoding position for a storage medium, comprising:
adding a plurality of diffractive markers to the medium for making locations of stored data; and
adding a plurality of compound grooves between diffractive markers along a coordinate direction, each compound groove having a transverse groove type for encoding position across multiple compound grooves.

2. A method as claimed in claim 1, wherein each diffractive marker includes a pit and each compound groove includes a plurality of pits.

3. A method as claimed in claim 1, wherein the act of adding the plurality of diffractive markers includes etching the diffractive markers, and the act of adding the plurality of compound grooves includes etching the compound grooves.

4. A method as claimed in claim 1, wherein the storage medium includes a holographic medium and the stored data includes holographic data.

5. A method as claimed in claim 1, wherein position is encoded in a frame invariant manner with LSFR (Linear Feedback Shift Register) code.

6. A method as claimed in claim 1, wherein position is encoded with a cyclic frame invariant code.

7. A method of encoding position for a storage medium, comprising:
adding a plurality of diffractive markers to the medium for marking locations of stored data; and
adding a plurality of compound grooves between diffractive markers along a coordinate direction, each compound groove having internal interruptions for encoding position within that compound groove.

8. A method as claimed in claim 7, wherein each diffractive marker includes a pit and each compound groove includes a plurality of pits.

9. A method as claimed in claim 7, wherein the act of adding the plurality of diffractive markers includes etching the diffractive markers, and the act of adding the plurality of compound grooves includes etching the compound grooves.

10. A method as claimed in claim 7, wherein the storage medium includes a holographic medium and the stored data includes holographic data.

11. A method as claimed in claim 7, wherein position is encoded in a frame invariant manner with an LFSR code.

12. A method as claimed in claim 7, wherein position is encoded with a cyclic frame invariant code.

13. A method of encoding position for a storage medium, comprising:
adding a plurality of diffractive markers to the medium for marking locations of stored data, the diffractive markers being arranged along a first coordinate direction and along a second coordinate direction;
adding a plurality of first compound grooves between diffractive markers along the first coordinate direction, each first compound groove having a transverse groove type for encoding position across multiple first compound grooves, and each first compound groove having internal interruptions for encoding position within that first compound groove; and
adding a plurality of second compound grooves between diffractive markers along the second coordinate direction, each second compound groove having a transverse groove type for encoding position across multiple second compound grooves, and each second compound groove having internal interruptions for encoding position within that second compound groove.

14. A method as claimed in claim 13, wherein each diffractive marker includes a pit and each compound groove includes a plurality of pits.

15. A method as claimed in claim 13, wherein the act of adding the plurality of diffractive markers includes etching the diffractive markers, and the act of adding the plurality of compound grooves includes etching the compound grooves.

16. A method as claimed in claim 13, wherein the storage medium includes a holographic medium and the stored data includes holographic data.

17. A method of determining position on a storage medium, comprising:
scanning the medium in a transverse direction across a plurality of compound grooves that are aligned in a coordinate direction of the medium, each compound groove having a transverse groove type for encoding position across multiple compound grooves, wherein crossing a threshold number of compound grooves determines a position on the medium.

18. A method as claimed in claim 17, wherein the act of scanning includes:
shining a beam across the compound grooves;
measuring corresponding diffraction patterns in segmented photodetectors to determine the diffraction data; and
using the diffraction data to determine the position on the medium.

19. A method as claimed in claim 17, wherein the storage medium includes a holographic medium.

20. A method of determining position on a storage medium, comprising:
scanning the medium along a compound groove that is aligned in a coordinate direction of the medium, the compound groove having internal interruptions for encoding position within the compound groove, wherein crossing a codeword of interruptions determines a position on the medium.

21. A method as claimed in claim 20, wherein the act of scanning includes:
shining a beam along the compound groove;
measuring corresponding diffraction patterns in one or more photodetectors to determine the diffraction data; and
using the diffraction data to determine the position on the medium.

22. A method as claimed in claim 21, wherein the photodetectors are segmented.

23. A method as claimed in claim 20, wherein the storage medium includes a holographic medium.

24. A data storage system comprising:
a storage medium for storing data at different locations in the medium, the medium including a plurality of diffractive markers for marking locations of stored data in the medium and a plurality of compound grooves for marking positions on the medium, each compound groove having a transverse groove type for encoding position across multiple compound grooves.

25. A system as claimed in claim 24, wherein scanning across a threshold number of compound grooves determines a position on the medium.

26. A system as claimed in claim 24, wherein each diffractive marker includes a pit and each compound groove includes a plurality of pits.

27. A system as claimed in claim 24, wherein the storage medium includes a holographic medium and the stored data includes holographic data.

28. A system as claimed in claim 27, wherein a constellation of diffractive markers indicates a location of a hologram.

29. A system as claimed in claim 27, wherein a constellation of four diffractive markers indicates a location of a hologram.

30. A system as claimed in claim 24, wherein position is encoded in a frame invariant manner with an LFSR code.

31. A system as claimed in claim 24, wherein position is encoded with a cyclic frame invariant code.

32. A data storage system comprising:
a storage medium for storing data at different locations in the medium, the medium including a plurality of diffractive markers for marking locations of stored data in the medium and a plurality of compound grooves for marking positions on the medium, each compound groove having internal interruptions for encoding position within the compound groove.

33. A system as claimed in claim 32, wherein scanning across a codeword of interruptions determines a position on the medium.

34. A system as claimed in claim 32, wherein each diffractive marker includes a pit and each compound groove includes a plurality of pits.

35. A system as claimed in claim 32, wherein the storage medium includes a holographic medium and the stored data includes holographic data.

36. A system as claimed in claim 35, wherein a constellation of diffractive markers indicates a location of a hologram.

37. A system as claimed in claim 35, wherein a constellation of four diffractive markers indicates a location of a hologram.

38. A system as claimed in claim 32, wherein position is encoded in a frame invariant manner with an LFSR code.

39. A system as claimed in claim 32, wherein position is encoded with a cyclic frame invariant code.

* * * * *